(12) United States Patent
Kim et al.

(10) Patent No.: US 12,493,224 B2
(45) Date of Patent: Dec. 9, 2025

(54) OPTICAL SHUTTER AND SELECTIVE TRANSPARENT DISPLAY DEVICE USING THE SAME

(71) Applicant: LG Display Co., Ltd., Seoul (KR)

(72) Inventors: Daeyong Kim, Paju-si (KR); Jigon Kim, Paju-si (KR); Jaejung Han, Paju-si (KR); Eunhee Choi, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 525 days.

(21) Appl. No.: 17/977,480

(22) Filed: Oct. 31, 2022

(65) Prior Publication Data

US 2023/0176441 A1    Jun. 8, 2023

(30) Foreign Application Priority Data

Dec. 8, 2021 (KR) .................. 10-2021-0174855

(51) Int. Cl.
*G02F 1/1676* (2019.01)
*G02F 1/167* (2019.01)
*G02F 1/1677* (2019.01)
*G02F 1/1685* (2019.01)

(52) U.S. Cl.
CPC ............ *G02F 1/1676* (2019.01); *G02F 1/167* (2013.01); *G02F 1/1677* (2019.01); *G02F 1/1685* (2019.01)

(58) Field of Classification Search
CPC ...... G02F 1/1676; G02F 1/167; G02F 1/1677; G02F 1/1685; G02F 1/16762; G02F 1/1323; G02F 1/1681; G02F 1/061; G02F 1/0316; G02B 26/004; G02B 26/02
See application file for complete search history.

(56) References Cited

U.S. PATENT DOCUMENTS

| | | | |
|---|---|---|---|
| 11,448,908 B1* | 9/2022 | Fan Jiang | ......... G02F 1/133526 |
| 2002/0030785 A1 | 3/2002 | Enomoto et al. | |
| 2019/0163020 A1* | 5/2019 | Ikeno | .................... G02F 1/1323 |

FOREIGN PATENT DOCUMENTS

| | | |
|---|---|---|
| JP | 2005-99408 A | 4/2005 |
| KR | 10-0557379 B1 | 3/2006 |
| KR | 10-2007-0000551 A | 1/2007 |
| KR | 10-2016-0001808 A | 1/2016 |
| KR | 10-2021-0055416 A | 5/2021 |

* cited by examiner

*Primary Examiner* — Mariam Qureshi
(74) *Attorney, Agent, or Firm* — Birch, Stewart, Kolasch & Birch, LLP

(57) ABSTRACT

A selective transparent display device according to an embodiment can be operated in a transparent mode in which a background is transmitted, a clear mode in which the background is blocked, and a viewing angle control mode in which the background is blocked only at a specific viewing angle or within a specific viewing angle range depending on the usage environment. The selective transparent display device can include a transparent display panel configured to display images and an optical shutter disposed on a surface of the transparent display panel.

17 Claims, 10 Drawing Sheets

220

OPTICAL SHUTTER AND SELECTIVE TRANSPARENT DISPLAY DEVICE USING THE SAME

CROSS REFERENCE TO RELATED APPLICATION

The present application claims priority to Korean Patent Application No. 10-2021-0174855, filed Dec. 8, 2021 in the Republic of Korea, the entire contents of which are hereby expressly incorporated by reference into the present application.

BACKGROUND OF THE DISCLOSURE

Field of Technology

The present disclosure relates to an optical shutter and a selective transparent display device using the same.

Description of the Related Art

An organic light emitting diode display is a self-luminous display device, and unlike a liquid crystal display (LCD), it does not require a separate light source. As such, it can be manufactured in a lightweight and thin form. Further, since the organic light emitting diode display is driven at a low voltage, it is advantageous in terms of power consumption and excellent color realization, response speed, viewing angle, and contrast ratio (CR) and thus, is being studied as the next-generation display.

Attempts have been made to manufacture such an organic light emitting display device as a transparent organic light emitting display device (transparent display device). A transparent display device is a display device in which an image and a background of the display device can be viewed together.

A sub-pixel of the transparent organic light emitting display is divided into a light emitting area, which is an area in which the organic light emitting device emits light to display an image, and a transmission area, which is an area through which external light is transmitted. Transparency in the transparent organic light emitting display device is secured through the transmission area.

SUMMARY OF THE DISCLOSURE

A transparent display device provides an image in which a display image and a background are superimposed through the background. The background generally refers to a rear surface of the transparent display device. Although it is an advantage of the transparent display device that the display image and the background can be simultaneously viewed, the visibility of the display image can be deteriorated.

Depending on the usage environment, there can be a case where a user is not interested in the background and want to focus on the displayed image. For example, when a transparent display device is used in a vehicle display device, it is helpful for the driver to see the background as well as the display image. The assistant, on the other hand, will not be interested in the background and will want to focus on the display image. As such, the function to view the display image and the background at the same time can be inconvenient depending on the usage environment.

The present disclosure is intended to solve or address the above problems and other limitations associated with the related art.

Accordingly, an optical shutter according to an embodiment of the present disclosure can operate in a transmissive mode in which light is transmitted, a blocking mode in which light is blocked, and a viewing angle control mode in which light is blocked only at a specific viewing angle or within a specific viewing angle range.

A selective transparent display device according to the embodiment of the present disclosure is operated in a transparent mode in which a background is transmitted, a clear mode in which the background is blocked, and a viewing angle control mode in which the background is blocked only at a specific viewing angle or within a specific viewing angle range depending on the usage environment.

One embodiment of the present disclosure provides an optical shutter including: a first substrate; a louver layer disposed on the first substrate and formed of a prism pattern having mountains and valleys formed alternately while a plurality of first inclined surfaces and second inclined surfaces meet each other; a second substrate disposed on the louver layer; electrophoretic particles provided in spaces between the louver layer and the second substrate, and the louver layer includes a transparent insulating film disposed on the second inclined surface, the first substrate includes a plurality of first and second electrodes formed on an inner surface of the first substrate, the second substrate includes a plurality of third electrodes formed on an inner surface of the second substrate, the first electrode and the third electrode are disposed opposite to each other, and the second electrode is disposed between the first electrodes.

The first electrode can be disposed at a position of the valley. The second electrode can be disposed at a position corresponding to the mountain.

The first electrode and the second electrode can be formed separately from each other.

The optical shutter includes a control unit for adjusting a voltage applied to the first, second, and third electrodes based on a drive mode of the optical shutter.

The control unit can apply a voltage to form an electric field between the first electrode and the third electrode in a transmissive mode.

The electrophoretic particles are all negative charges, and the control unit can apply a negative voltage to the third electrode, and applying a positive voltage to the first electrode.

The control unit can apply a voltage to form an electric field between the second electrode and the third electrode in a viewing angle control mode of the optical shutter.

The control unit can apply a voltage to form an electric field between an odd-numbered electrode of the first electrode and an odd-numbered electrode of the third electrode in a transflective mode of the optical shutter.

The control unit can, in a half field angle control mode of the optical shutter, apply a voltage to form an electric field between an odd-numbered electrode of the first electrode and an odd-numbered electrode of the third electrode, and apply a voltage to form an electric field between an even-numbered electrode of the second electrode and an even-numbered electrode of the third electrode.

The prism pattern includes a trapezoidal or a triangular cross section.

The first inclined surfaces and the second inclined surfaces can be formed as curved surfaces.

Another embodiment of the present disclosure can provide a selective transparent display device including: an optical shutter according to the aforementioned one embodiment of the present disclosure; and a transparent display panel displaying an image by emitting a light emitting element formed in a plurality of pixels according to inputted image data, where the optical shutter is disposed on a rear surface of the transparent display device.

The optical shutter according to the embodiment of the present disclosure can operate in a transmissive mode in which light is transmitted, a blocking mode in which light is blocked, and a viewing angle control mode in which light is blocked only at a specific viewing angle or within a specific viewing angle range.

A selective transparent display device according to the embodiment of the present disclosure is operated in a transparent mode in which a background is transmitted, a clear mode in which the background is blocked, and a viewing angle control mode in which the background is blocked only at a specific viewing angle or within a specific viewing angle range depending on the usage environment, thereby providing an optimal image depending on the usage environment.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
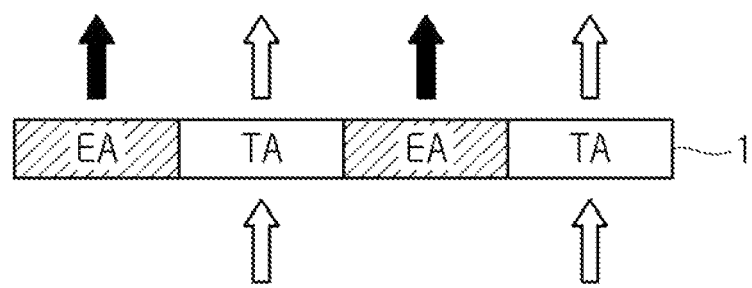
FIG. 1 is a drawing that schematically shows a structure of a transparent display device.

Shapes, sizes, ratios, angles, numbers and the like disclosed in the accompanying drawings are taken merely as examples to explain embodiments and the present disclosure is not limited thereto. Like reference numerals denote like elements throughout the specification. In addition, in describing the present disclosure, if a description of a related known art in detail is deemed to unnecessarily obscure the substance of the present disclosure, description of such art will be omitted. When terms, 'comprise', 'have' and 'be achieved' and the like, are used in the present disclosure, other object not mentioned therein can be added unless the terms are used with the term 'only'. The singular forms expressed herein are intended to include the plural forms as well, unless the context expressly indicates otherwise.

Components are interpreted to include an error range unless otherwise expressly stated.

In case of describing positions, for example, when describing position relation between two parts with terms such as 'in', 'upon', 'below', 'next' and the like, one or more intervening parts can be disposed between the two parts, unless the terms are used with terms 'immediately' or 'directly'.

Though terms such as 'a first', or 'a second' and the like are used to describe various components, these components are not confined by these terms. These terms are merely used to distinguish one component from the other component. Therefore, a first component being mentioned in the description below can be a second component in a technical concept of the present disclosure.

Like reference numerals denote like elements throughout the specification.

Hereinafter, various embodiments of the present disclosure will be described in detail with reference to accompanying drawings. The titles of the components used hereinbelow are chosen for convenience of description, and they can differ from what they are actually named. Further, all components of each transparent display device according to all embodiments of the present disclosure are operatively coupled and configured.

FIG. 1 is a drawing that schematically shows a structure of a transparent display device.

Referring to FIG. 1, a transparent display device 1 has a display area where a plurality of pixel areas are defined. The transparent display device 1 can include self-luminous display elements that emit light by themselves. The self-luminous display elements can be composed of organic light emitting diodes (hereinafter, OLED).

One pixel can be divided into a non-transmitting area (EA) and a transmitting area (TA). In the non-transmitting area (EA), OLEDs and a pixel circuit composed of a plurality of thin film transistors (TFT) are disposed. The transmitting area (TA) is a transparent area where light can be transmitted. Though some configuration constituting OLEDs can be disposed in the transmitting area (TA), it is preferable that a reflective electrode such as an anode electrode that hampers transparency should not be disposed in the transmitting area.

In case such transparent display device 1 does not display an image, the transparent display device 1 can serve as a transparent window where an incident light entered from a front surface is transmitted through a rear surface, and to the contrary, an incident light entered from a rear surface is transmitted through a front surface.

On the other hand, when the transparent display device 1 displays an image, the background is transmitted and an image in which the display image and the background are superimposed is provided. The background preferably means being positioned behind the transparent display device. It is an advantage that the display image and the background can be viewed at the same time, but visibility of the display image can be deteriorated. As such, the present disclosure addresses these limitations and are discussed referring to FIGS. 2-16.

Figure 2:
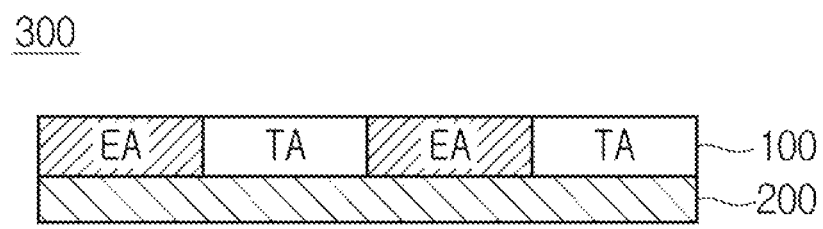
FIG. 2 is a drawing that schematically shows a structure of a transparent display device according to an embodiment of the present disclosure.

Particularly, FIG. 2 is a drawing that schematically shows a structure of a transparent display device according to an embodiment of the present disclosure.

Referring to FIG. 2, a selective transparent display device 300 according to the embodiment of the present disclosure includes a transparent display panel 100 and an optical shutter 200 disposed on a rear surface of the transparent display panel 100. In this case, the transparent display panel 100 can emit light towards a front surface thereof.

The optical shutter 200 transmits or blocks incident light according to a drive mode. In addition, according to the drive mode, the optical shutter 200 blocks light in the range of the first angle, but transmits the light in the range of the second angle. Therefore, depending on the drive mode of the optical shutter 200, the incident light entered from the rear surface of the optical shutter 200 and transmitted through the optical shutter 200 can be seen at the first position, but at a second position away from the first position, the incident light entered from the rear surface of the optical shutter 200 cannot be seen.

Figure 3:
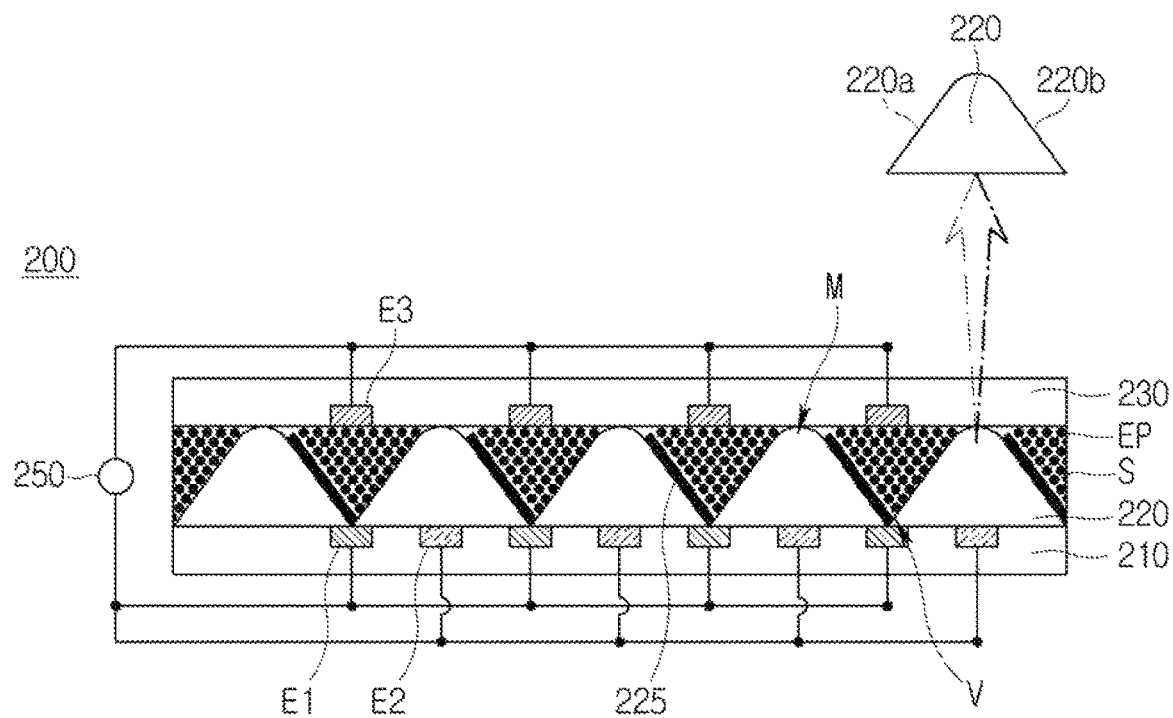
FIG. 3 is a sectional view illustrating a structure of an optical shutter according to an embodiment of the present disclosure.

FIG. 3 is a sectional view illustrating a structure of an optical shutter according to an embodiment of the present disclosure.

Referring to FIG. 3, the optical shutter 200 includes a first substrate 210, a louver layer 220 disposed on the first substrate 210, a second substrate 230 disposed on the louver layer 220, a plurality of electrophoretic particles (EP) provided in the spaces (S) between the louver layer 220 and the second substrate 230, and a control unit 250 that adjusts a voltage applied to the optical shutter 200 based on the drive mode of the optical shutter 200.

The first substrate 210 includes a plurality of first electrodes (E1) and second electrodes (E2) formed on the inner surface of the first substrate 210. In the first substrate 210, the first electrodes (E1) and the second electrodes (E2) are patterned and formed. The first electrodes (E1) and the second electrodes (E2) are formed separately from each other. The first electrode E1 and the second electrode E2 can be regularly arranged at a predetermined distance apart from each other. The first electrode (E1) and the second electrode (E2) are preferably transparent electrodes.

The second substrate 230 includes a plurality of third electrodes (E3) formed on an inner surface of the second substrate 230. The third electrode (E3) is patterned and formed on the second substrate 230. The third electrode (E3) is preferably transparent electrode. Each of the third electrodes E3 can be regularly arranged at a predetermined distance apart from each other.

The louver layer 220 is formed in a prism pattern having mountains (M) and valleys (V) formed alternately by a plurality of the first inclined surfaces 220a and second inclined surfaces 220b as they meet each other. Here, the louver layer 220 serves as a spacer for maintaining a uniform distance between the first substrate 210 and the second substrate 230. The louver layer 220 can be formed of a transparent polymer material. The louver layer 220 can be formed of a material which is resistant to a high temperature and a high humidity and can include an optical clear resin (OCR) and epoxy resin. The louver layer 220 can be manufactured of a material having no problem in melting by reacting with the solvent contained in a transparent organic material and can be manufactured in an ultra-violet (UV) curing method. The louver layer 220 includes an insulating film 225 disposed on the second inclined surface 220b. The insulating film 225 is preferably a transparent material that can transmit light. The insulating film 225 can be composed of various transparent inorganic insulating materials.

Figure 4:
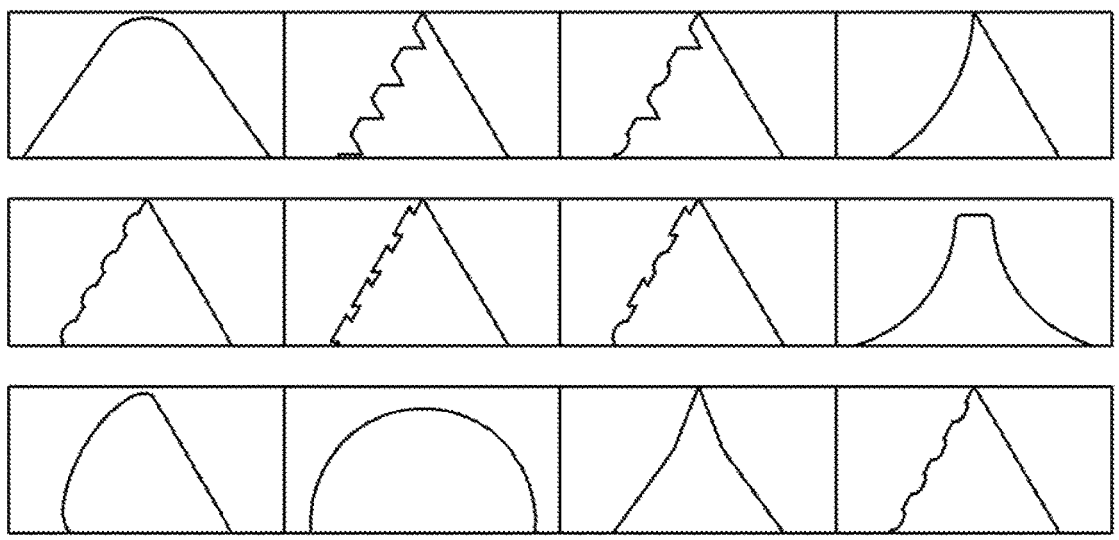
FIG. 4 is a drawing illustrating a sectional form of a prism pattern of a louver layer according to examples of the present disclosure.

The cross-section of the prism pattern of the louver layer 220 can have various forms as shown in FIG. 4. The prism pattern of louver layer 220 can have a trapezoidal or a triangular cross section. Further, the first inclined surface 220a and the second inclined surface 220b can be formed as curved surfaces.

The electrophoretic particles (EP) are provided inside a space (S) between the louver layer 220 and the second substrate 230. The positions of the electrophoretic particles (EP) that block light are aligned depending on the applied electric field, thereby operating the optical shutter 200 in a transmissive mode, a blocking mode and a viewing angle control mode. The electrophoretic particles (EP) can be composed of black carbon particles of an organic material. The electrophoretic particles (EP) can have a positive charge or a negative charge. However, each of the electrophoretic particles (EP) should be of the same polarity so that they can be dispersed when an electric field is not applied. In other words, it is advantageous to configure the electrophoretic particles (EP) to have all positive charges, or all negative charges.

The first electrode (E1) is disposed at a position of a valley (V) in the prism pattern of the louver layer 220. Further, the third electrode (E3) and the first electrode (E1) are disposed opposite to each other.

The second electrode is disposed at a position corresponding to the mountain in the prism pattern of the louver layer 220. The mountain (M) of the louver layer 220 contacts with the second substrate 230, and the second electrode (E2) is formed on the inner surface of the first substrate 210, at a position opposite to a position where the mountain (M) and the second substrate 230 are in contact. Further, the second electrode (E2) and the third electrode (E3) both are disposed to face each other with the transparent insulating film 225 in the middle therebetween. The second electrode (E2) can be disposed between the valleys (V) that include black carbon particles. Thus, the second electrode (E2) can be disposed between the regions where the valley (V) and the inner surface of the first substrate 210 are in contact. The second electrode (E2) can be disposed between the first electrodes (E1).

The control unit 250 adjusts a voltage applied to the first, second and third electrodes (E1, E2, E3) based on the drive mode of the optical shutter 200. The control unit 250 can control a switch connected to the first, second and third electrodes (E1, E2, E3). Depending on a voltage applied by the control unit 250, the electric field formed by the first, second and third electrodes (E1, E2, E3) becomes different, and depending on the formed electric field, the electrophoretic particles (EP) are arranged by aligning with a shape of the space (S) formed by the prism pattern of the louver layer 220. Depending on the arrangement of the electrophoretic particles (EP), the optical shutter 200 can operate in the transmissive mode in which light is transmitted, the blocking mode in which light is blocked, and the viewing angle control mode in which light is blocked only at a specific viewing angle or within a specific viewing angle range. In addition, the optical shutter 200 can operate in a transflective mode having intermediate properties between the transmissive mode and the blocking mode, and also in a half field angle control mode having intermediate properties between the transmissive mode and the viewing angle control mode.

Figure 5:
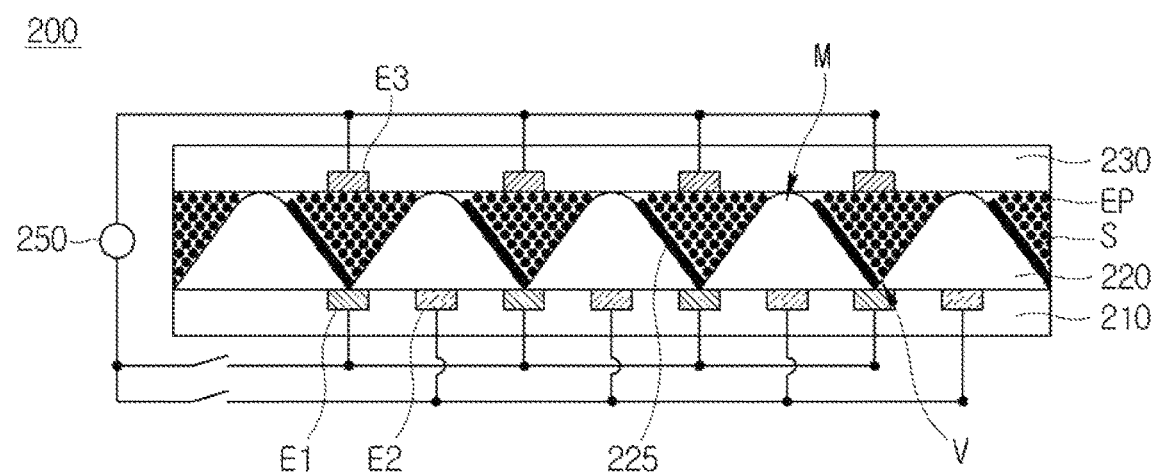
FIG. 5 is a drawing illustrating operation of an optical shutter in a blocking mode according to an example of the present disclosure.
Figure 6:
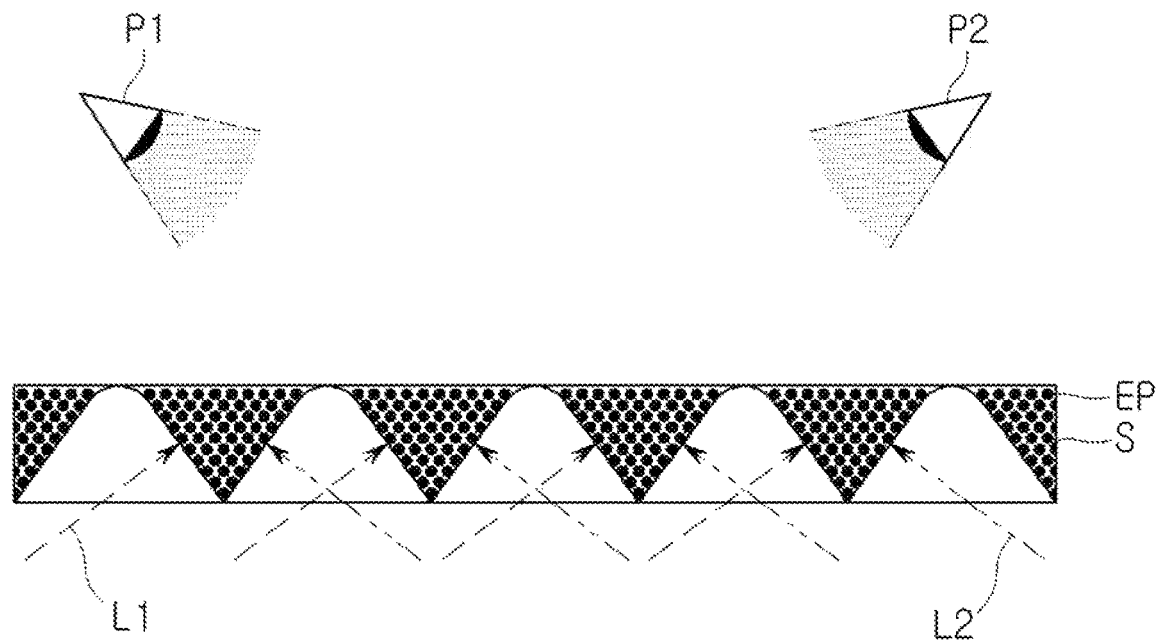
FIG. 6 is a drawing illustrating how light is blocked in a blocking mode according to an example of the present disclosure.

FIG. 5 is a drawing illustrating operation of an optical shutter 200 in a blocking mode and FIG. 6 is a drawing illustrating how light is blocked in a blocking mode.

With reference to FIGS. 5 and 6 to explain the blocking mode, the optical shutter 200 does not form an electric field between the first electrode (E1) and the third electrode (E3). Further, in the blocking mode, the optical shutter 200 does not form an electric field between the second electrode (E2) and the third electrode (E3). The electrophoretic particles (EP) are composed of black carbon particles of organic materials and blocks light. Since the electrophoretic particles (EP) have all positive charges or all negative charges, when an electric field is not applied, the electrophoretic particles (EP) are dispersed and spread uniformly on the inside of the spaces (S) between the louver layer 220 and the second substrate 230. Therefore, in the blocking mode, the optical shutter 200 blocks external lights (L1, L2) at the entire viewing angles entered at a first angle and a second angle. Therefore, in the blocking mode, light entered from a rear surface of the optical shutter 200 cannot be seen at a first position (P1) and a second position (P2).

Figure 7:
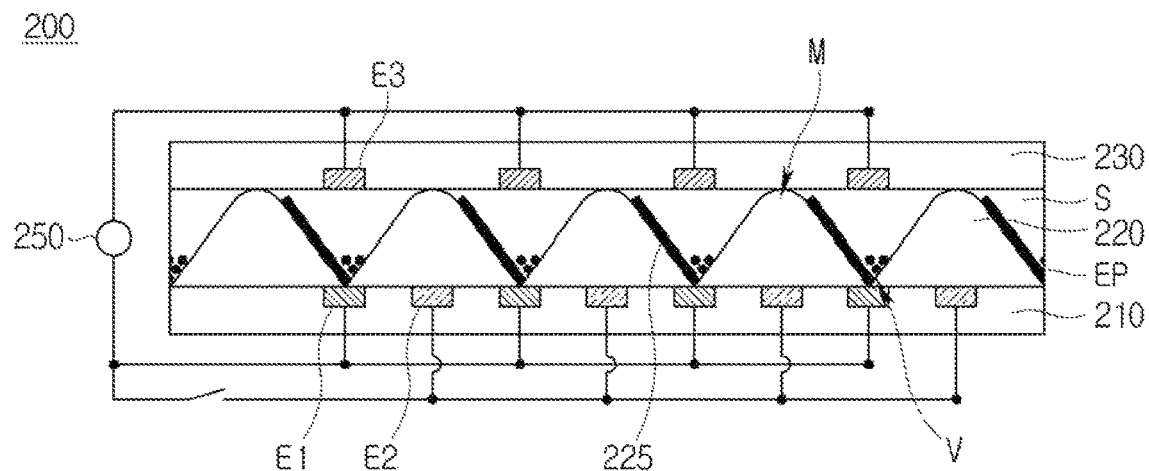
FIG. 7 is a drawing illustrating operation of an optical shutter in a transmissive mode according to an example of the present disclosure.
Figure 8:
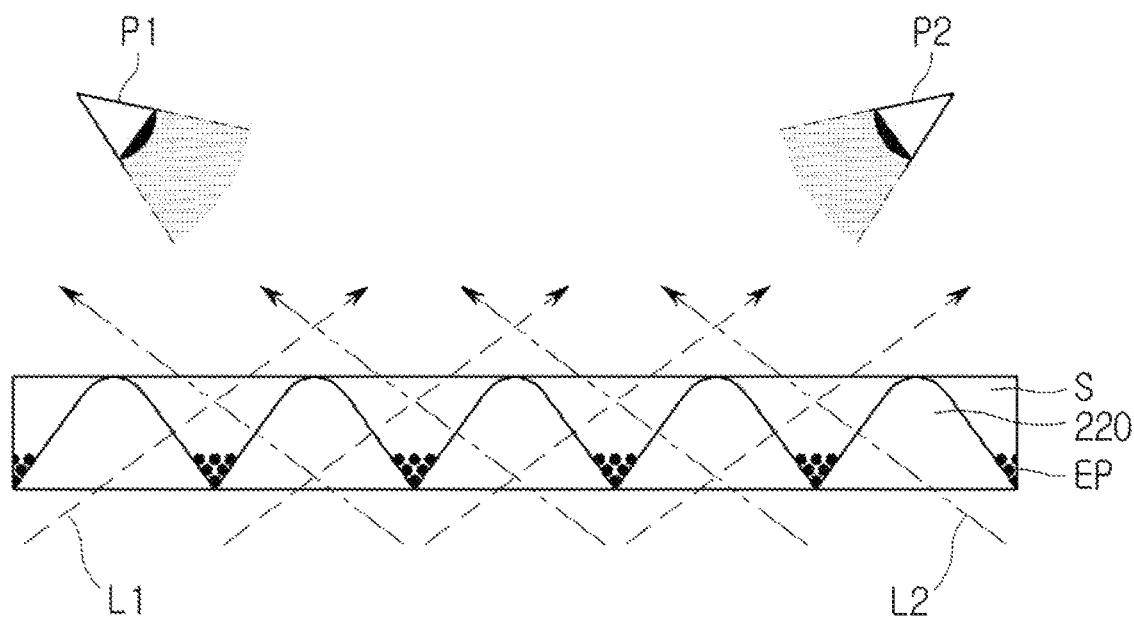
FIG. 8 is a drawing illustrating how light is transmitted in a transmissive mode according to an example of the present disclosure.

FIG. 7 is a drawing illustrating operation of an optical shutter 200 in a transmissive mode and FIG. 8 is a drawing illustrating how light is transmitted in a transmissive mode.

With reference to FIGS. 7 and 8 to explain the transmissive mode, the control unit 250, in the transmissive mode, applies a voltage to form an electric field between the first electrode (E1) and the third electrode (E3). For example, if the electrophoretic particles (EP) are composed of negative charges only, a negative voltage is applied to the third electrode (E3) and a positive voltage is applied to the first electrode (E1). In addition, if the electrophoretic particles (EP) are composed of positive charges only, a positive voltage is applied to the third electrode (E3) and a negative voltage is applied to the first electrode (E1). Since the first electrode (E1) is disposed at the position of the valley (V) of the louver layer 220 and the third electrode (E3) is disposed opposite to the first electrode (E1), the electrophoretic particles (EP) aggregate in the valley (V) region by the electric field formed between the first electrode (E1) and the third electrode (E3). Since the electrophoretic particles (EP) blocking light is disposed at the narrow valley (V) region, the optical shutter 200, in the transmissive mode, lets external light (L1, L2) at the entire viewing angles that enter at the first angle and the second angle transmit. Therefore, in the transmissive mode, it is possible to see light entered through the rear surface of the optical shutter 200, at the first position (P1) and the second position (P2) both.

Figure 9:
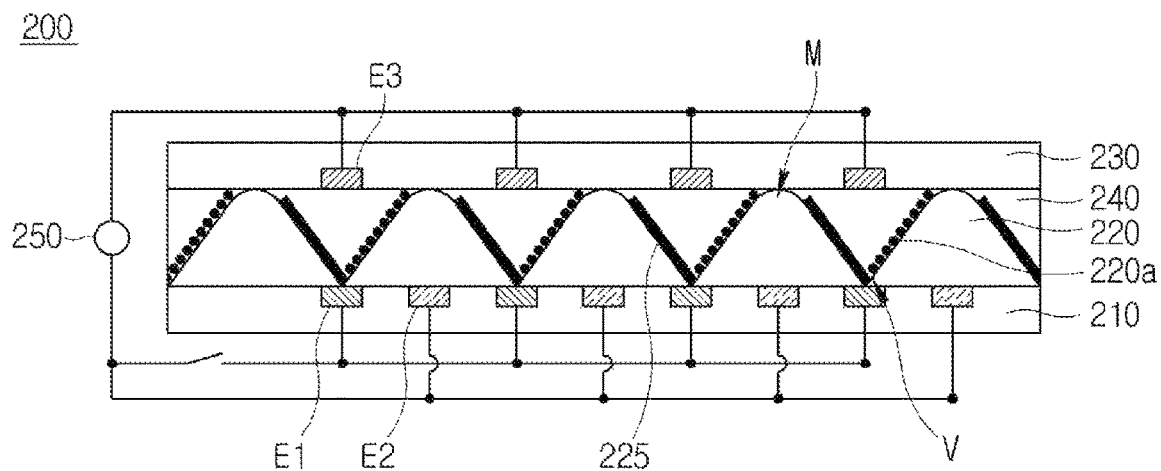
FIG. 9 is a drawing illustrating operation of an optical shutter in a viewing angle control mode according to an example of the present disclosure.
Figure 10:
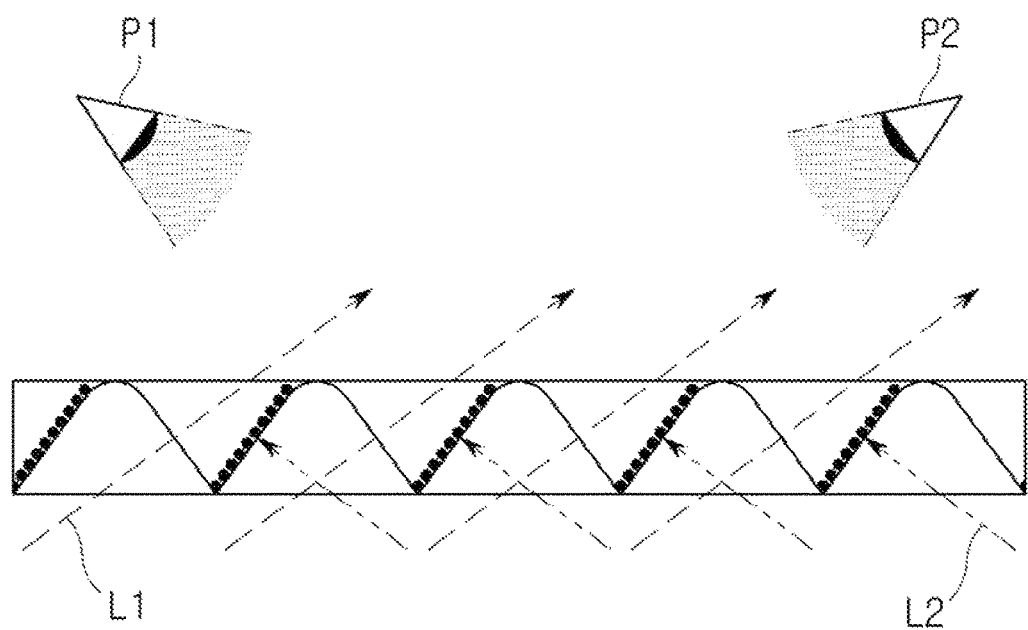
FIG. 10 is a drawing illustrating how light is blocked only at a specific viewing angle in a viewing angle control mode according to an example of the present disclosure.

FIG. 9 is a drawing illustrating operation of an optical shutter in a viewing angle control mode and FIG. 10 is a drawing illustrating how light is blocked only at a specific viewing angle or within a specific viewing angle range in a viewing angle control mode.

With reference to FIGS. 9 and 10 to explain the viewing angle control mode, the control unit 250, in the viewing angle control mode, applies a voltage to form an electric field between the second electrode (E2) and the third electrode (E3). For example, if the electrophoretic particles (EP) are composed of negative charges only, a negative voltage is applied to the third electrode (E3) and the positive voltage is applied to the second electrode (E2). If the electrophoretic particles (EP) are composed of positive charges only, the positive voltage is applied to the third electrode (E3) and the negative voltage is applied to the second electrode (E2). The second electrode is disposed at a position corresponding to the mountain in the prism pattern of the louver layer 220, and the third electrode (E3) and the second electrode (E2) are disposed to face each other with the transparent insulating film 225 disposed on the second inclined surface 220b. Therefore, the electrophoretic particles (EP) are aligned and are disposed on the first inclined surface 220a of the louver layer 220 by the electric field formed between the second electrode (E2) and the third electrode (E3). Since the electrophoretic particles (EP) blocking light is aligned and disposed on the first inclined surface 220a of the louver layer 220, the optical shutter 200, in the viewing angle control mode, lets the first external light (L1) entered at an angle parallel to the first inclined surface 220a be transmitted and blocks the second external light (L2) entered at an angle crossing the first inclined surface 220a. Therefore, in the viewing angle control mode, the incident light entered from the rear surface of the optical shutter 200 cannot be seen at the first position (P1) and the incident light entered from the rear surface of the optical shutter 200 can be seen at the second position (P2).

Figure 11:
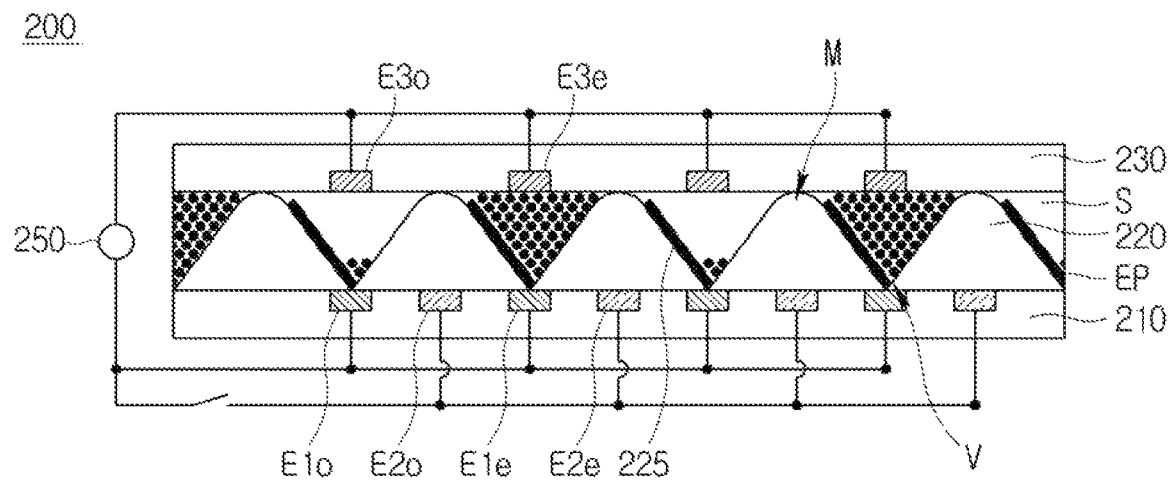
FIG. 11 is a drawing illustrating operation of an optical shutter in a transflective mode according to an example of the present disclosure.
Figure 12:
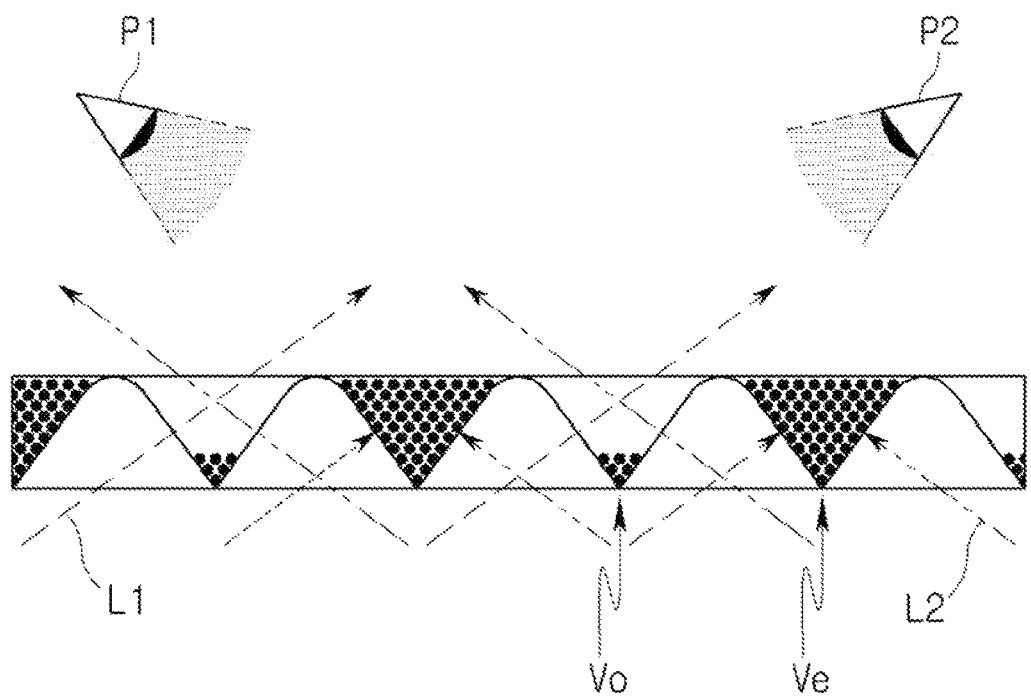
FIG. 12 is a drawing illustrating how light is controlled in a transflective mode according to an example of the present disclosure.

FIG. 11 is a drawing illustrating operation of an optical shutter 200 in a transflective mode, and FIG. 12 is a drawing illustrating how light is controlled in a transflective mode.

The transflective mode has intermediate properties between the transmissive mode and the blocking mode. With reference to FIGS. 11 and 12 to explain the transflective mode, the control unit 250 applies a voltage to form an electric field between an odd-numbered electrode (E1o) of the first electrode and an odd-numbered electrode (E3o) of the third electrode in the transflective mode. For example, if the electrophoretic particles (EP) have all negative charges, the control unit 250 applies a negative voltage to an odd-numbered electrode of the third electrode (E3o) and applies a positive voltage to an odd-numbered electrode of the first electrode (E1o). The electrophoretic particles (EP) aggregate in the valley (V) region by the electric field formed between the odd-numbered first electrode (E1) and the third electrode (E3). Unlike a case in FIG. 7, while the electrophoretic particles (EP) aggregate only in the odd-numbered valley (Vo) region where the odd-numbered electrode of the first electrode (E1o) is disposed, the electrophoretic particles (EP) stay to be uniformly dispersed in the even-numbered valley (Ve) region. Therefore, the region where the odd-numbered valley (Vo) is disposed transmits the external light entered at the entire viewing angles, however, the region where the even-numbered valley (Ve) is disposed blocks the external light (L1, L2) entered at the entire viewing angles, entered at the first angle and the second angle.

However, the present disclosure is not limited thereto, and it is possible to let the electrophoretic particles (EP) aggregate in the region of the even-numbered valley (Ve), and let the electrophoretic particles (EP) dispersed in the region of the odd-numbered valley (Vo). As such, in the transflective mode, light entered from the rear surface of the optical shutter 200 can be seen both at the first position (P1) and at the second position (P2), however, transmittance of light entered from the rear surface of the optical shutter 200 becomes lowered by half than light transmittance of the transmissive mode. In the transflective mode, transmittance of the optical shutter 200 is the same at the first position (P1) and at the second position (P2). Transmittance of the optical shutter 200 is determined depending on a spacing of the first electrode applying the electric field and a spacing of the third electrode applying the electric field. If widening the spacing more, transmittance of the optical shutter 200 can be improved in the transflective mode.

Figure 13:
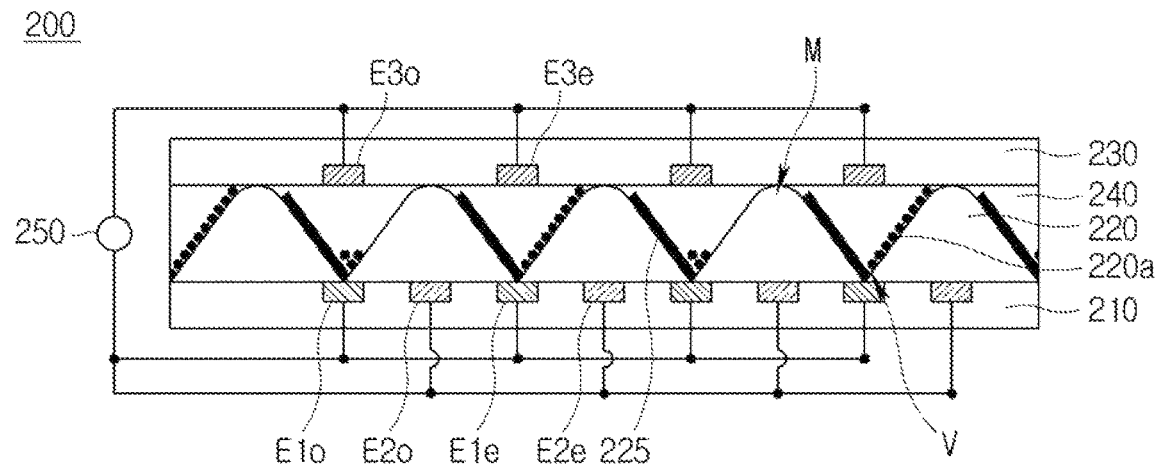
FIG. 13 is a drawing illustrating operation of an optical shutter in a half field angle control mode according to an example of the present disclosure.
Figure 14:
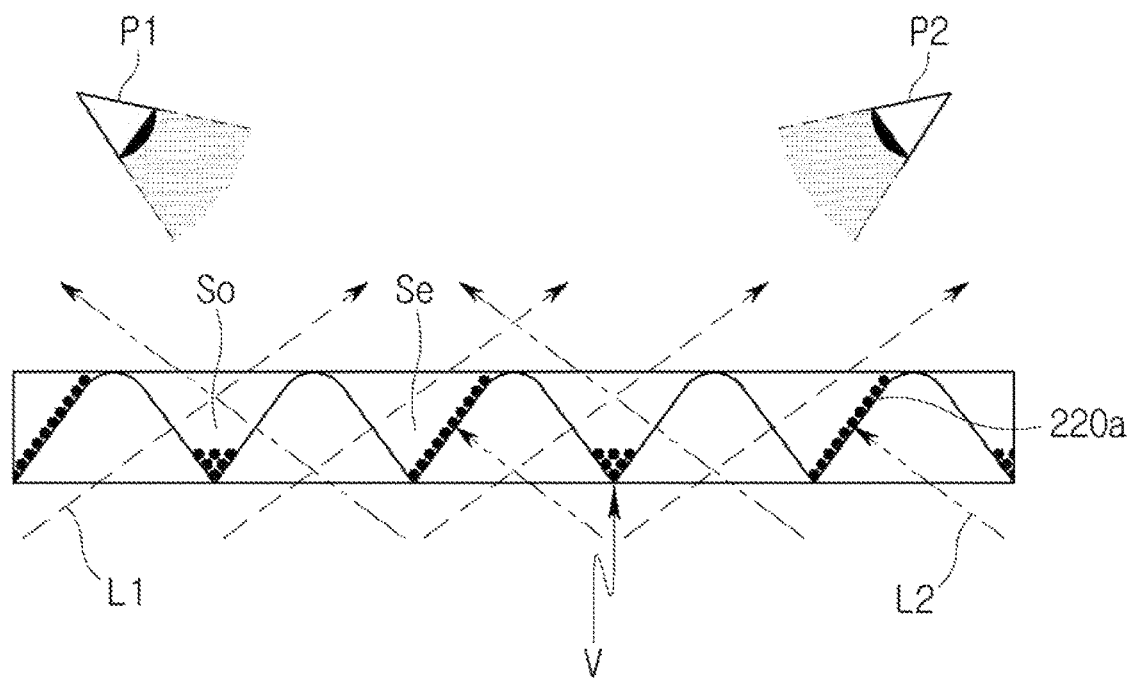
FIG. 14 is a drawing illustrating how light is controlled in a half field angle control mode according to an example of the present disclosure.

FIG. 13 is a drawing illustrating operation of an optical shutter in a half field angle control mode, and FIG. 14 is a drawing illustrating how light is controlled in a half field angle control mode.

The half field angle control mode has intermediate properties between the transmissive mode and the viewing angle control mode. With reference to FIGS. 13 and 14 to explain the half field angle control mode, the control unit 250, in the half field angle control mode, applies a voltage to form an electric field between the odd-numbered electrode of the first electrode (E1o) and the odd-numbered electrode of the third electrode (E3o), and applies a voltage to form an electric field between the even-numbered electrode of the second electrode (E2e) and the even-numbered electrode of the third electrode (E3e). For example, if the electrophoretic particles (EP) have all negative charges, the control unit 250 applies a negative voltage to the entire third electrodes (E3), applies a positive voltage to an odd-numbered electrode of the first electrode (E1o) and to an even-numbered electrode of the second electrode (E2e). The electrophoretic particles (EP) aggregate in the valley (V) region by the electric field formed between the odd-numbered first electrode (E1o) and the odd-numbered third electrode (E3o). Further, the electrophoretic particles (EP) are aligned and disposed on the first inclined surface 220a of the louver layer 220 by the electric field formed between the even-numbered second electrode (E2e) and the even-numbered third electrode (E3e). In other words, in the half field angle control mode, the electrophoretic particles (EP) aggregate in the valley (V) region in a space of an odd row (So) and the electrophoretic particles (EP) are aligned and disposed on the first inclined surface 220a in a space of an even row (Se). The electrophoretic particles (EP) aligned and disposed on the first inclined surface 220a of the louver layer 220 transmit a first incident light (L1) entered at an angle parallel to the first inclined surface 220a and block a second incident light (L2) entered at an angle crossing the first inclined surface 220a.

Unlike a case of FIG. 9, in the half field angle control mode, the electrophoretic particles (EP) are aligned and disposed on the first inclined surface 220a in the space of the even row, while the electrophoretic particles (EP) aggregate in the valley region (V) in the space of the odd row. Therefore, external light (L1, L2) of the entire viewing angles is transmitted in the space of the odd row. In the space of the even row, the first incident light (L1) entered at an angle parallel to the first inclined surface 220a is transmitted, and the second incident light (L2) entered at an angle crossing the first inclined surface 220a is blocked. However, the present disclosure is not limited thereto, and it can be possible to make the electrophoretic particles (EP) aggregate in the even-numbered valley (Ve) region and be aligned and disposed on the first inclined surface 220a in the odd-numbered valley (Vo) region. As such, in the half field angle control mode, it can be possible to make transmittance of light entered from the rear surface of the optical shutter 200 vary depending on a position. In FIGS. 13 and 14, according to illustration, transmittance at the second position (P2) is higher than transmittance at the first position (P1).

Figure 15:
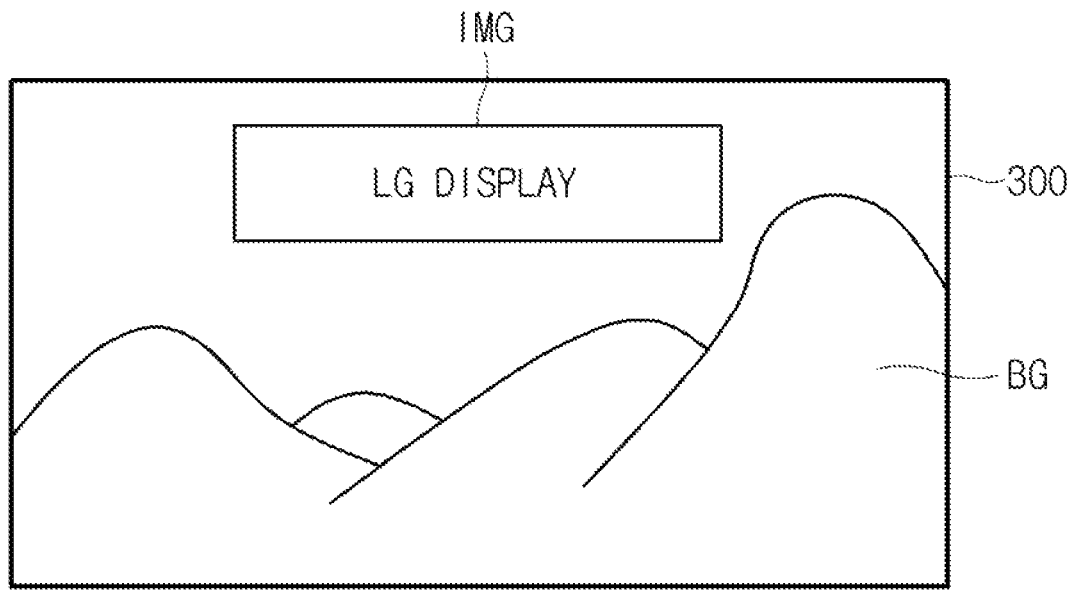
FIG. 15 is a drawing that schematically shows a screen of a selective transparent display device in a transparent mode according to an embodiment of the present disclosure.
Figure 16:
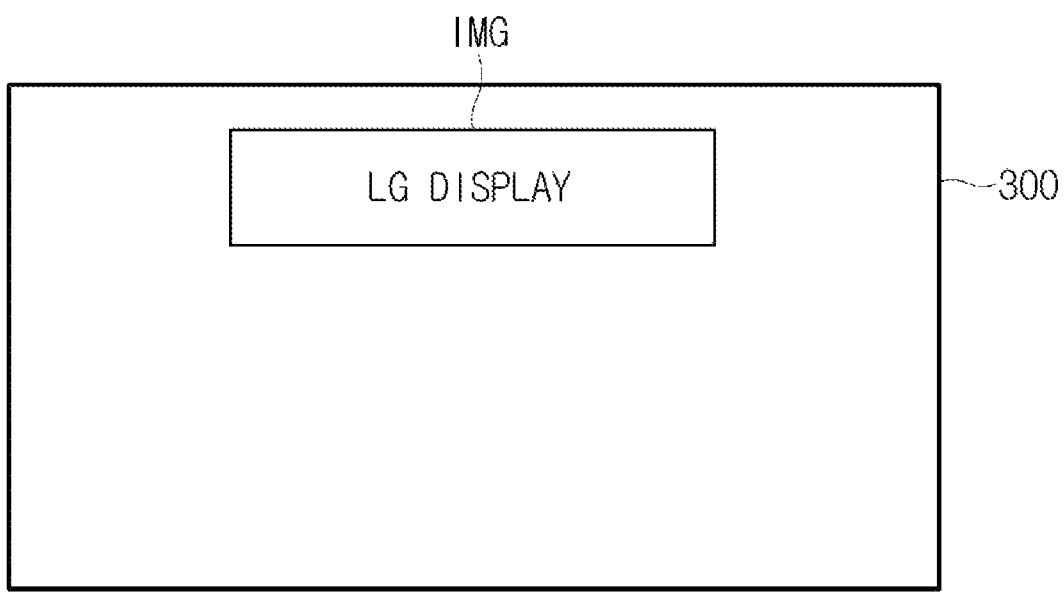
FIG. 16 is a drawing that schematically shows a screen of a selective transparent display device in a clear mode according to an embodiment of the present disclosure.

FIG. 15 is a drawing that schematically shows a screen of a selective transparent display device in a transparent mode according to an embodiment of the present disclosure. FIG. 16 is a drawing that schematically shows a screen of a selective transparent display device in a clear mode (e.g., block mode) according to an embodiment of the present disclosure.

A selective transparent display device according to the embodiment can be operated in a transparent mode in which a background is transmitted, a clear mode in which the background is blocked, and a viewing angle control mode in which the background is blocked only at a specific viewing angle or within a specific viewing angle range depending on the usage environment.

In the transparent mode, the background (BG) is transmitted. In the transparent mode, the optical shutter 200 operates in the transmissive mode of FIGS. 7 and 8. A viewer of the selective transparent display device can view an image (IMG) and a background (BG) at the same time as in FIG. 15.

In the clear mode, the background is blocked. In the clear mode, the optical shutter 200 operates in the blocking mode of FIGS. 5 and 6. A viewer of the selective transparent display device can view an image (IMG) only as in FIG. 16. A viewer in the clear mode can focus on a displayed image only.

In the viewing angle control mode, a background (BG) is blocked only at a specific viewing angle or within a specific viewing angle range. In the viewing angle control mode, the optical shutter 200 operates in the viewing angle control mode of FIGS. 9 and 10. If the selective transparent display device according to the embodiment is equipped in a car, a driver at the first position and an assistant at the second position can see the screen in each different state. In other words, a driver at the first position can see a displayed image (IMG) and a background (BG) at the same time, and an assistant at the second position can see a displayed image (IMG) only. For example, a driver at the first position sees a screen of FIG. 15 and an assistant at the second position can see a screen of FIG. 16. In that case, a driver can see a displayed image (IMG) and a background (BG) at the same time, and so, driving is not disturbed because there is no blind area due to the display device. On the other hand, the assistant can see a clear image since only the image (IMG) is displayed.

It should be understood that the embodiments set forth hereinabove are exemplary and are not limitative. The scope of the present disclosure is represented by the following claims rather than the detailed description above, and it should be construed that all modifications or variations that are derived from the meaning, scope and the concept of equivalence of the claims are covered in the scope of the claims of the present disclosure.

What is claimed is:

1. An optical shutter comprising:
   a first substrate;
   a louver layer disposed on the first substrate and formed of a prism pattern having mountains and valleys formed alternately while a plurality of first inclined surfaces and a plurality of second inclined surfaces meet each other;
   a second substrate disposed on the louver layer; and
   electrophoretic particles provided in spaces between the louver layer and the second substrate,
   wherein the louver layer comprises a transparent insulating film disposed on at least one of the plurality of second inclined surfaces, wherein the first substrate comprises first and second electrodes disposed on an inner surface of the first substrate, wherein the second substrate comprises a third electrode disposed on the inner surface of the second substrate, wherein the first electrode and the third electrode are disposed opposite to each other, wherein the second electrode is disposed between the first electrode and another first electrode, wherein the mountains of the louver layer are in contact with the second substrate, wherein the first electrode is disposed at a position of one of the valleys, and wherein the second electrode is disposed at a position corresponding to a position where one of the mountains and the second substrate are in contact with each other.

2. The optical shutter of claim 1, wherein the electrophoretic particles are formed of black carbon particles of organic materials and block light.

3. The optical shutter of claim 1, wherein the louver layer is formed of a transparent polymer material, and wherein the first electrode, the second electrode and the third electrode are transparent electrodes.

4. The optical shutter of claim 1, wherein the first electrode and the second electrode are disposed separately from each other.

5. The optical shutter of claim 1, wherein the optical shutter further comprises:

a control unit configured to adjust a voltage applied to the first, second, and third electrodes based on a drive mode of the optical shutter.

6. The optical shutter of claim 5, wherein in a block mode of the optical shutter, the control unit is configured so that no voltage is applied to the first, second, and third electrodes.

7. The optical shutter of claim 6, wherein the control unit applies a voltage to form an electric field between the second electrode and the third electrode in a viewing angle control mode of the optical shutter.

8. The optical shutter of claim 7, wherein in the viewing angle control mode of the optical shutter, the electrophoretic particles are aligned and disposed on at least one of the first inclined surfaces of the louver layer by the electric field disposed between the second electrode and the third electrode.

9. The optical shutter of claim 6, wherein the control unit applies a voltage to form an electric field between an odd-numbered electrode of the first electrode and an odd-numbered electrode of the third electrode in a transflective mode of the optical shutter.

10. The optical shutter of claim 6, wherein the control unit, in a half field angle control mode of the optical shutter, applies a voltage to form an electric field between an odd-numbered electrode of the first electrode and an odd-numbered electrode of the third electrode, and applies a voltage to form an electric field between an even-numbered electrode of the second electrode and an even-numbered electrode of the third electrode.

11. The optical shutter of claim 5, wherein the control unit applies a voltage to form an electric field between the first electrode and the third electrode in a transmissive mode of the optical shutter.

12. The optical shutter of claim 11, wherein the electrophoretic particles are all negative charges, or all positive charges, wherein when the electrophoretic particles are all negative charges, the control unit applies a negative voltage to the third electrode, and applies a positive voltage to the first electrode, and wherein when the electrophoretic particles are all positive charges, the control unit applies a positive voltage to the third electrode, and applies a negative voltage to the first electrode.

13. The optical shutter of claim 1, wherein the prism pattern comprises a trapezoidal or a triangular cross section.

14. The optical shutter of claim 1, wherein the plurality of first inclined surfaces and the plurality of second inclined surfaces are curved surfaces.

15. A selective transparent display device comprising:

a transparent display panel configured to display images; and the optical shutter of claim 1, which is disposed on a surface of the transparent display panel.

16. The optical shutter of claim 1, wherein the third electrode is spaced apart from the louver layer.

17. The optical shutter of claim 1, wherein the third electrode overlaps the first electrode and does not overlap the second electrode in plan view.

* * * * *